US009650553B2

(12) United States Patent
Deur-Bert et al.

(10) Patent No.: US 9,650,553 B2
(45) Date of Patent: May 16, 2017

(54) AZEOTROPIC OR QUASI-AZEOTROPIC COMPOSITION OF CHLOROMETHANE

(71) Applicant: Arkema France, Colombes (FR)

(72) Inventors: Dominique Deur-Bert, Charly (FR); Laurent Wendlinger, Soucieu en Jarrest (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 14/655,500

(22) PCT Filed: Dec. 6, 2013

(86) PCT No.: PCT/FR2013/052975
§ 371 (c)(1),
(2) Date: Jun. 25, 2015

(87) PCT Pub. No.: WO2014/102478
PCT Pub. Date: Jul. 3, 2014

(65) Prior Publication Data
US 2015/0353799 A1 Dec. 10, 2015

(30) Foreign Application Priority Data
Dec. 26, 2012 (FR) ...................................... 12 62763

(51) Int. Cl.
C09K 5/04 (2006.01)
C09K 3/30 (2006.01)
B01F 17/00 (2006.01)
H01B 3/56 (2006.01)
C09K 3/00 (2006.01)

(52) U.S. Cl.
CPC .......... C09K 5/044 (2013.01); B01F 17/0035 (2013.01); B01F 17/0085 (2013.01); C09K 3/00 (2013.01); C09K 3/30 (2013.01); C09K 5/045 (2013.01); H01B 3/56 (2013.01); C09K 2205/122 (2013.01); C09K 2205/126 (2013.01); C09K 2205/32 (2013.01)

(58) Field of Classification Search
CPC . C09K 5/04; C09K 5/044; C09K 3/30; C09K 5/045; C09K 3/00; B01F 17/0035; B01F 17/0085; H01B 3/56
USPC ............................ 252/67; 510/177, 408, 415
See application file for complete search history.

(56) References Cited

U.S. PATENT DOCUMENTS 5,294,358 A * 3/1994 Dantinne ............... C09K 5/045 252/364
7,629,397 B2 12/2009 McDonald et al.
8,070,977 B2 12/2011 Rached
8,075,798 B2 12/2011 Rached
8,246,850 B2 8/2012 Rached
8,252,198 B2 8/2012 Rached
8,557,135 B2 10/2013 Rached
8,808,569 B2 8/2014 Rached
8,858,824 B2 10/2014 Boussand
8,858,825 B2 10/2014 Guerin et al.
9,011,711 B2 4/2015 Rached
9,028,706 B2 5/2015 Rached et al.
9,039,922 B2 5/2015 Rached
9,127,191 B2 9/2015 Rached
9,133,379 B2 9/2015 Rached
9,175,203 B2 11/2015 Rached
9,267,064 B2 2/2016 Rached
9,399,726 B2 * 7/2016 Rached .................. C09K 5/045
9,505,968 B2 11/2016 Rached
9,512,343 B2 12/2016 Rached et al.
2008/0051612 A1 2/2008 Knapp et al.
2011/0084228 A1 4/2011 Rached
2011/0095224 A1 4/2011 Rached
2011/0186772 A1 8/2011 Rached
2011/0219791 A1 9/2011 Rached
2011/0219792 A1 9/2011 Rached
2011/0240254 A1 10/2011 Rached (Continued)

FOREIGN PATENT DOCUMENTS

EP 0 495 543 A1 7/1992
WO WO 2013/096005 A1 6/2013

OTHER PUBLICATIONS

Guérin, Sophie, et al., U.S. Appl. No. 14/903,461, entitled, "2,3,3,3-Tetrafluoropropene Compositions Having Improved Miscibility," filed in the U.S. Patent and Trademark Office on Jan. 7, 2016.
Boussand, Beatrice, et al., U.S. Appl. No. 14/990,159, entitiled "Stable 2,3,3,3-Tetrafluoropropene Composition," filed in the U.S. Patent and Trademark office on Jan. 7, 2016.
Rached, Wissam, U.S. Appl. No. 14/992,387 entitled, "Ternary Compositions for High-Capacity Refrigeration," filed in the U.S. Patent and Trademark Office on Jul. 11, 2016.
Guerin, Sophie, et al., U.S. Appl. No. 15/070,955, entitled "Heat-Transfer Compositions Exhibiting Improved Miscibility with the Lubricating Oil," filed in the U.S. Patent and Trademark Office Mar. 15, 2016.

(Continued)

Primary Examiner — Douglas McGinty
(74) Attorney, Agent, or Firm — Buchanan Ingersoll & Rooney P.C.

(57) ABSTRACT

Quasi-azeotropic or azeotropic compositions containing chloromethane and at least one or more compound(s) selected from 2,3,3,3-tetrafluoropropene, 3,3,3-trifluoropropene, 1,1,1,2-tetrafluoroethane, 1,1,1,2,2-pentafluoropropane, E/Z-1,1,3,3,3-pentafluoropropene, E/Z-1,2,3,3,3-pentafluoropropene, 1,1-difluoroethane and E-1,3,3,3-tetrafluoropropene. The composition may include either from 0.5 to 70 mol % of chloromethane and at least from 99.5 to 30 mol % of a compound selected from 2,3,3,3-tetrafluoropropene, 1,1-difluoroethane, 3,3,3-trifluoropropene and 1,1,1,2-tetrafluoroethane, or from 55 to 95 mol % of chloromethane and at least from 45 to 5 mol % of one or more compound(s) selected from 1,1,1,2,2-pentafluoropropane, E/Z-1,1,3,3,3-pentafluoropropene, E/Z-1,2,3,3,3-pentafluoropropene and E-1,3,3,3-tetrafluoropropene.

15 Claims, No Drawings

(56) References Cited

U.S. PATENT DOCUMENTS

| | | |
|---|---|---|
| 2011/0284181 A1 | 11/2011 | Rached |
| 2012/0049104 A1 | 3/2012 | Rached |
| 2012/0056123 A1 | 3/2012 | Rached |
| 2012/0068105 A1 | 3/2012 | Rached et al. |
| 2012/0144857 A1 | 6/2012 | Rached |
| 2012/0151958 A1 | 6/2012 | Rached |
| 2012/0151959 A1 | 6/2012 | Rached |
| 2012/0153213 A1 | 6/2012 | Rached |
| 2012/0159982 A1 | 6/2012 | Rached |
| 2012/0161064 A1 | 6/2012 | Rached |
| 2012/0167615 A1 | 7/2012 | Rached |
| 2012/0205574 A1 | 8/2012 | Rached et al. |
| 2012/0261252 A1 | 10/2012 | Knapp |
| 2013/0092869 A1 | 4/2013 | Boussand |
| 2013/0105724 A1 | 5/2013 | Boussand |
| 2013/0158218 A1* | 6/2013 | Thomas .................. C08F 2/06 526/206 |
| 2013/0186114 A1 | 7/2013 | Guerin et al. |
| 2014/0008565 A1 | 1/2014 | Rached et al. |
| 2014/0075969 A1 | 3/2014 | Guerin et al. |
| 2014/0318160 A1 | 10/2014 | Rached |
| 2014/0326017 A1 | 11/2014 | Rached |
| 2015/0027146 A1 | 1/2015 | Boussand |
| 2015/0152306 A1 | 6/2015 | Rached |
| 2015/0152307 A1 | 6/2015 | Rached |
| 2015/0322317 A1* | 11/2015 | Collier .................. C09K 5/045 252/67 |
| 2015/0322321 A1 | 11/2015 | Deur-Bert et al. |
| 2015/0344761 A1 | 12/2015 | Rached |
| 2015/0353802 A1 | 12/2015 | Rached |
| 2016/0009555 A1 | 1/2016 | Bonnet et al. |
| 2016/0024363 A1 | 1/2016 | Rached |
| 2016/0025394 A1 | 1/2016 | Rached |
| 2016/0244652 A1 | 8/2016 | Rached |
| 2016/0272561 A1 | 9/2016 | Rached et al. |
| 2016/0298014 A1 | 10/2016 | Rached |
| 2016/0355718 A1 | 12/2016 | Rached |
| 2016/0376484 A1 | 12/2016 | Guerin et al. |

OTHER PUBLICATIONS

Rached, Wissam, et al., U.S. Appl. No. 15/073,108 entitled "Stabilization of 1-Chloro-3,3,3-Trifluoropropene," filed in the U.S. Patent and Trademark Office on Mar. 17, 2016.

International Search Report (PCT/ISA/210) mailed on Mar. 11, 2014, by the French Patent Office as the International Searching Authority for International Application No. PCT/FR2013/052975.

Collier, Bertrand, et al., U.S. Appl. No. 14/651,855 entitled "Composition Including 2,3,3,3-Tetrafluoropropene," filed in the U.S. Patent and Trademark Office on Jun. 12, 2015.

Deur-Bert, Dominique, et al., U.S. Appl. No. 14/651,925 entitled "Composition Containing 2,3,3,3-Tetrafluoropropene and 1,2-Difluoroethylene," filed in the U.S. Patent and Trademark Office on Jun. 12, 2015.

Rached, Wissam, U.S. Appl. No. 14/823,430 entitled "Use of Ternary Compositions," filed in the U.S. Patent and Trademark Office on Aug. 11, 2015.

Rached, Wissam, U.S. Appl. No. 14/830,130 entitled "Binary Refrigerating Fluid," filed in the U.S. Patent and Trademark Office on Aug. 19, 2015.

Bonnet, Phillippe, et al., U.S. Appl. No. 14/772,950 entitled "Composition Comprising HF and 2,3,3,3-Tetrafluoropropene," filed in the U.S. Patent and Trademark Office on Sep. 4, 2015.

Rached, Wissam, U.S. Appl. No. 14/873,855 entitled "Heat Transfer Fluid," filed in the U.S. Patent and Trademark Office on Oct. 2, 2015.

Rached, Wissam, U.S. Appl. No. 14/873,891 entitled "Ternary Compositions for Low-Capacity Refrigeration," filed in the U.S. Patent and Trademark Office on Oct. 2, 2015.

Rached, Wissam, U.S. Appl. No. 15/238,883 entitled "Heat Transfer Fluid Replacing R-134a," filed in the U.S. Patent and Trademark Office on Aug. 17, 2016.

Rached, Wissam, et al., U.S. Appl. No. 15/297,569 entitled "Composition Based on 2,3,3,3-Tetrafluoropropene," filed in the U.S. Patent and Trademark Office on Oct. 19, 2016.

Rached, Wissam, et al., U.S. Appl. No. 15/368,347 entitled "Vehicle Heating and/or Air Conditioning Method", filed in the U.S. Patent and Trademark Office on Dec. 2, 2016.

Rached, Wissam, U.S. Appl. No. 15/396,855 entitled "Heat Transfer Fluid," filed in the U.S. Patent and Trademark Office on Jan. 3, 2017.

* cited by examiner

AZEOTROPIC OR QUASI-AZEOTROPIC COMPOSITION OF CHLOROMETHANE

The present invention relates to azeotropic or quasi-azeotropic compositions comprising chloromethane.

Fluids based on halocarbons have found many applications in various industrial fields, in particular as heat transfer fluid, propellants, foaming agents, blowing agents, gaseous dielectrics, monomer or polymerization medium, support fluids, agents for abrasives, drying agents and fluids for energy production units.

Particular importance is given to fluids that have a low impact on the environment.

The advantage of using azeotropic or quasi-azeotropic fluids is that they do not fractionate during evaporation processes and act (almost) as a pure body. However, it is difficult to identify novel fluids that meet these characteristics, since azeotropes cannot be predicted.

The invention thus relates to an azeotropic or quasi-azeotropic composition comprising chloromethane and at least one or more compound(s) selected from 2,3,3,3-tetrafluoropropene, 3,3,3-trifluoropropene, 1,1,1,2-tetrafluoroethane, 1,1,1,2,2-pentafluoropropane, E/Z-1,1,3,3,3-pentafluoropropene, E/Z-1,2,3,3,3-pentafluoro-propene, 1,1-difluoroethane and E-1,3,3,3-tetrafluoropropene.

The expression "quasi-azeotropic" has a broad meaning and is intended to include the compositions that are strictly azeotropic and those that behave as an azeotropic mixture.

A mixture is azeotropic when the pressure at the dew point is equal to that at the bubble point, which means that the vapor composition is equal to that of the condensed liquid.

A mixture is considered to be quasi-azeotropic when the pressure difference between the pressure at the dew point and the pressure at the bubble point is less than or equal to 5%, on the basis of the pressure at the bubble point.

According to one embodiment, the composition according to the invention comprises, preferably essentially consisting of, either (from) 0.5 to 70 mol % of chloromethane and from 99.5 to 30 mol % of at least one compound selected from 2,3,3,3-tetrafluoropropene, 1,1-difluoroethane, 3,3,3-trifluoropropene and 1,1,1,2-tetrafluoroethane, or (from) 55 to 95 mol % of chloromethane and (from) 45 to 5 mol % of at least one compound selected from 1,1,1,2,2-pentafluoropropane, E/Z-1,1,3,3,3-pentafluoropropene, E/Z-1,2,3,3,3-pentafluoro-propene and E-1,3,3,3-tetrafluoro-propene.

According to one preferred embodiment, the composition according to the invention comprises, preferably essentially consisting of, chloromethane, preferably from 10 to 50 mol %, and at least compound(s) selected from 2,3,3,3-tetrafluoropropene, 3,3,3-trifluoropropene, E/Z-1,1,3,3,3-pentafluoropropene, E/Z-1,2,3,3,3-pentafluoropropene and E-1,3,3,3-tetrafluoropropene, preferably 2,3,3,3-tetrafluoropropene, preferably representing 50 to 90 mol %.

According to one particularly preferred embodiment, the composition according to the invention comprises, preferably essentially consisting of, (from) 10 to 45 mol % of chloromethane and (from) 90 to 55 mol % of 2,3,3,3-tetrafluoropropene.

In one embodiment, the composition according to the invention comprises, preferably essentially consisting of, (from) 0.5 to 50 mol % of chloromethane and (from) 95.5 to 50 mol % of 1,1,1,2-tetrafluoroethane.

In another embodiment, the composition according to the invention comprises, preferably essentially consisting of, (from) 35 to 65 mol % of chloromethane and (from) 65 to 35 mol % of 3,3,3-trifluoropropene.

According to one embodiment, the composition according to the invention comprises, preferably essentially consisting of, (from) 60 to 90 mol % of chloromethane and (from) 40 to 10 mol % of 1,1,1,2,2-pentafluoropropane.

According to another embodiment, the composition according to the invention comprises, preferably essentially consisting of, (from) 55 to 85 mol % of chloromethane and (from) 45 to 15 mol % of E/Z-1,1,3,3,3-pentafluoropropene.

According to one possibility offered by the invention, the composition according to the invention comprises, preferably essentially consisting of, (from) 60 to 90 mol % of chloromethane and (from) 40 to 10 mol % of E/Z-1,2,3,3,3-pentafluoropropene.

In one embodiment, the composition according to the invention comprises, preferably essentially consisting of, (from) 5 to 70 mol %, preferably from 10 to 60 mol % of chloromethane and (from) 95 to 30 mol %, preferably 40 to 90 mol % of 1,1-difluoroethane.

In another embodiment, the composition according to the invention comprises, preferably essentially consisting of, (from) 65 to 95 mol % of chloromethane and (from) 35 to 5 mol % of E-1,3,3,3-tetrafluoropropene.

According to one possibility offered by the invention, the composition may also comprise hydrogen fluoride.

According to one particularly preferred possibility offered by the invention, the composition according to the invention comprises, preferably essentially consisting of, (from) 20 to 45 mol % of HF, 5 to 20 mol % of chloromethane and 35 to 70 mol % of 2,3,3,3-tetrafluoropropene.

According to one embodiment, the composition according to the invention comprises, preferably essentially consisting of, (from) 15 to 45 mol % of HF, 35 to 60 mol % of chloromethane and 15 to 30 mol % of 1,1,1,2,2-pentafluoropropane.

According to another embodiment, the composition according to the invention is characterized in that it comprises, preferably essentially consisting of, (from) 15 to 45 mol % of HF, 1 to 30 mol % of chloromethane and 30 to 85 mol % of 1,1-difluoroethane.

According to one embodiment, the composition according to the invention comprises, preferably essentially consisting of, (from) 15 to 40 mol % of HF, 40 to 70 mol % of chloromethane and 10 to 30 mol % of E/Z-1,3,3,3-tetrafluoropropene.

According to another embodiment, the composition according to the invention has a boiling point between from −40° C. to 70° C. at a pressure of between 1 and 15 bar.

The invention also relates to the use of a fluid comprising the composition according to the invention as heat transfer fluid, propellants, foaming agents, blowing agents, gaseous dielectrics, monomer or polymerization medium, support fluids, agents for abrasives, drying agents and fluids for energy production units.

Preferably, the invention relates to the use of a fluid comprising the composition according to the invention as heat transfer fluid in a heat pump or refrigeration plant.

The invention also relates to a heat transfer plant comprising a vapor compression circuit containing a fluid comprising a composition according to the invention as heat transfer fluid or containing a heat transfer fluid as described above.

According to one embodiment, the plant is selected from mobile or stationary plants for heating via a heat pump, for air conditioning, and in particular for motor vehicle air conditioning or for centralized stationary air conditioning, for refrigeration or for freezing and Rankine cycles; and which is preferably an air conditioning plant.

The invention also relates to a process for heating or cooling a fluid or a body by means of a vapor compression circuit containing a heat transfer fluid, said process successively comprising the evaporation of the heat transfer fluid, the compression of the heat transfer fluid, the condensation of the heat fluid and the expansion of the heat transfer fluid, in which the heat transfer fluid is a fluid comprising a composition according to the invention.

The expression "heat transfer fluid" is understood to mean a fluid capable of absorbing heat by evaporating at low temperature and low pressure and of releasing heat by condensing at high temperature and high pressure, in a vapor compression circuit.

A heat transfer fluid optionally comprises one or more additives which are not heat transfer compounds for the envisaged application. The additives may in particular be selected from lubricants, nanoparticles, stabilizers, surfactants, tracers, fluorescent agents, odorous agents and solubilizing agents, as are well known to a person skilled in the art.

In what follows, the following compounds represent:
chloromethane: HCC-40 or F40
2,3,3,3-tetrafluoropropene: HFO-1234yf or F1234yf
3,3,3-trifluoropropene: HFO-1243zf or F1243zf
1,1,1,2-tetrafluoroethane: HFC-134a or F134a
1,1,1,2,2-pentafluoropropane: HFC-245cb or F245cb
E/Z-1,1,3,3,3-pentafluoropropene: HFO-1225zc or F1225zc
E/Z-1,2,3,3,3-pentafluoropropene: HFO-1225ye or F1225ye
1,1-difluoroethane: HFC-152a or F152a
E-1,3,3,3-tetrafluoropropene: HFO-1234ze-E or F1234ze-E The azeotropic compositions representative of the invention, non-limitingly, at various temperatures and pressures, are presented in table 1 below:

TABLE 1

| Azeotrope | Temperature (° C.) | Mole (%) of F40 | Mole (%) of Compound 2 | Temperature ° C. | Mole (%) of F40 | Mole (%) of Compound 2 |
|---|---|---|---|---|---|---|
| | Pressure: 1 bar absolute | | | Pressure 3 bar absolute | | |
| F40/F1234yf | −30 | 34 | 66 | −2.0 | 34 | 66 |
| F40/F1243zf | −27 | 53 | 47 | 1 | 54 | 46 |
| F40/F134a | −28 | 35 | 65 | 0 | 22 | 78 |
| F40/F245cb | −26 | 76 | 24 | 3 | 76 | 24 |
| F40/F1225zc | −25 | 70 | 30 | 3 | 69 | 31 |
| F40/F1225ye | −25 | 74 | 26 | 3.0 | 72 | 28 |
| F40/F152a | −25 | 54 | 46 | 3.0 | 42 | 58 |
| F40/F1234ze-E | −24 | 80 | 20 | 4.0 | 81 | 19 |
| | Pressure 10 bar absolute | | | Pressure 15 bar absolute | | |
| F40/F1234yf | 38 | 66 | 34 | 55 | 65 | 35 |
| F40/F1243zf | 40 | 55 | 45 | 59 | 56 | 44 |
| F40/F134a | 39 | 3 | 97 | — | — | — |
| F40/F245cb | 44 | 78 | 22 | 60 | 78 | 22 |
| F40/F1225zc | 44 | 68 | 32 | 60 | 68 | 32 |
| F40/F1225ye | 43 | 70 | 30 | 60 | 69 | 31 |
| F40/F152a | 43 | 27 | 73 | 59 | 21 | 79 |
| F40/F1234ze-E | 45 | 83 | 17 | 62 | 84 | 16 |

The invention claimed is:

1. An azeotropic or quasi-azeotropic composition comprising chloromethane and at least one or more compound(s) selected from 2,3,3,3-tetrafluoropropene, 3,3,3-trifluoropropene, 1,1,1,2,2-pentafluoropropane, E/Z-1,1,3,3,3-pentafluoropropene, E/Z-1,2,3,3,3-pentafluoropropene, and 1,1-difluoroethane, wherein the composition comprises either from 0.5 to 70 mol % of chloromethane and from 99.5 to 30 mol % of at least one or more compound(s) selected from 2,3,3,3-tetrafluoropropene, 1,1-difluoroethane, and 3,3,3-trifluoropropene, or
from 55 to 95 mol % of chloromethane and from 45 to 5 mol % of at least one or more compound(s) selected from 1,1,1,2,2-pentafluoropropane, E/Z-1,1,3,3,3-pentafluoropropene, and E/Z-1,2,3,3,3-pentafluoropropene.

2. The composition as claimed in claim 1, wherein the composition comprises either from 20 to 50 mol % of chloromethane and from 80 to 50 mol % of 2,3,3,3-tetrafluoropropene.

3. The composition as claimed in claim 1, wherein the composition comprises from 35 to 65 mol % of chloromethane and from 65 to 35 mol % of 3,3,3-trifluoropropene.

4. The composition as claimed in claim 1, wherein the composition comprises from 60 to 90 mol % of chloromethane and from 40 to 10 mol % of 1,1,1,2,2-pentafluoropropane.

5. The composition as claimed in claim 1, wherein the composition comprises from 55 to 85 mol % of chloromethane and from 45 to 15 mol % of E/Z-1,1,3,3,3-pentafluoropropene.

6. The composition as claimed in claim 1, wherein the composition comprises from 60 to 90 mol % of chloromethane and from 40 to 10 mol % of E/Z-1,2,3,3,3-pentafluoropropene.

7. The composition as claimed in claim 1, wherein the composition comprises from 5 to 70 mol % of chloromethane and from 95 to 30 mol % of 1,1-difluoroethane.

8. The composition as claimed in claim 1, wherein the composition further comprises hydrogen fluoride.

9. The composition as claimed in claim 8, wherein the composition comprises from 20 to 45 mol % of HF, 5 to 20 mol % of chloromethane and 35 to 70 mol % of 2,3,3,3-tetrafluoropropene.

10. The composition as claimed in claim 8, wherein the composition comprises from 15 to 45 mol % of HF, 35 to 60 mol % of chloromethane and 15 to 30 mol % of 1,1,1,2,2-pentafluoropropane.

11. The composition as claimed in claim 8, wherein the composition comprises from 15 to 45 mol % of HF, 1 to 30 mol % of chloromethane and 30 to 85 mol % of 1,1-difluoroethane.

12. An azeotropic or quasi-azeotropic composition comprising from 15 to 40 mol % of HF, 40 to 70 mol % of chloromethane and 10 to 30 mol % of E/Z-1,3,3,3-tetrafluoropropene.

13. The composition as claimed in claim 1, wherein the composition has a boiling point between from −40° C. to 70° C. and a pressure of between 1 and 15 bar.

14. The composition as claimed in claim 1, wherein the composition consists essentially of either from 0.5 to 70 mol % of chloromethane and from 99.5 to 30 mol % of a at least one or more compound(s) selected from 2,3,3,3-tetrafluoropropene, 1,1-difluoroethane, and 3,3,3-trifluoropropene, or from 55 to 95 mol % of chloromethane and from 45 to 5 mol % of at least one or more compound(s) selected from 1,1,1,2,2-pentafluoropropane, E/Z-1,1,3,3,3-pentafluoropropene, and E/Z-1,2,3,3,3-pentafluoropropene.

15. The composition as claimed in claim 1, wherein the composition consists of either from 0.5 to 70 mol % of chloromethane and from 99.5 to 30 mol % of a at least one or more compound(s) selected from 2,3,3,3-tetrafluoropropene, 1,1-difluoroethane, and 3,3,3-trifluoropropene, or from 55 to 95 mol % of chloromethane and from 45 to 5 mol % of at least one or more compound(s) selected from 1,1,1,2,2-pentafluoropropane, E/Z-1,1,3,3,3-pentafluoropropene, and E/Z-1,2,3,3,3-pentafluoropropene.

* * * * *